R. J. NUNN.
WOOD-SCREW.
No. 7,124. Reissued May 23, 1876
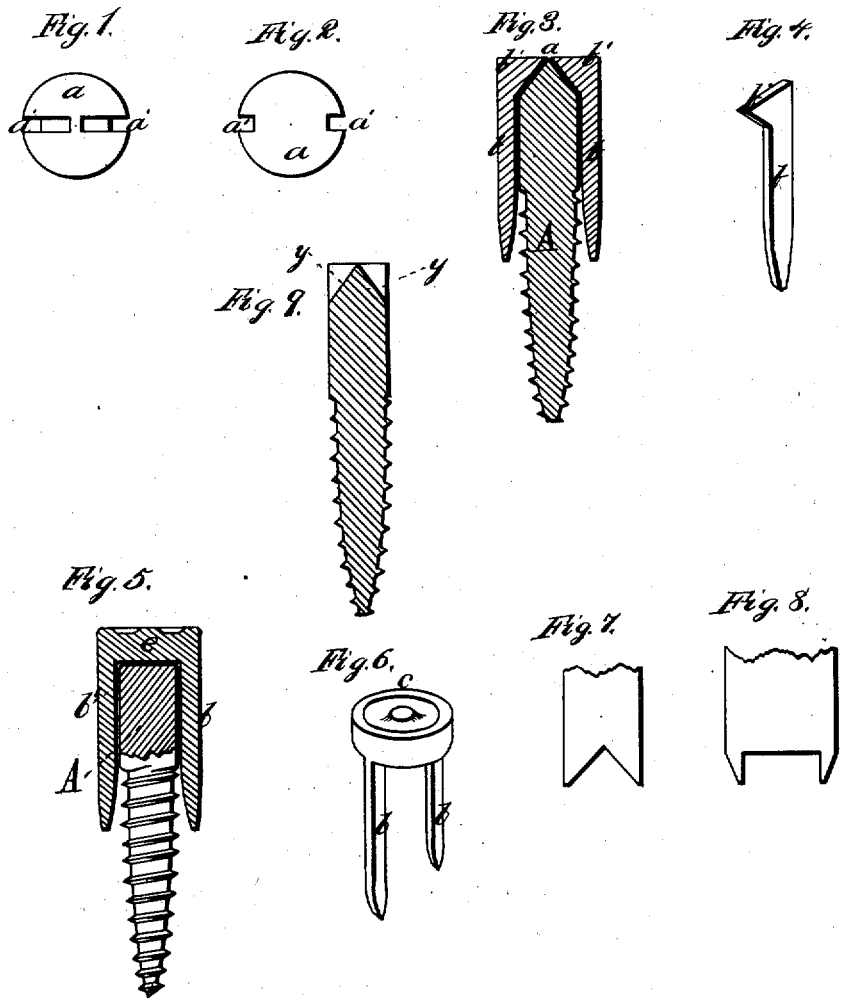
WITNESSES
Robert Everett
George W. Larner
INVENTOR,
Richard J. Nunn
Gilmore & Smith
ATTORNEYS.

UNITED STATES PATENT OFFICE.

RICHARD J. NUNN, OF SAVANNAH, GEORGIA, ASSIGNOR TO STERLING ELLIOTT, OF NEW HAVEN, CONNECTICUT.

IMPROVEMENT IN WOOD-SCREWS.

Specification forming part of Letters Patent No. 68,381, dated September 3, 1867; reissue No. 7,124, dated May 23, 1876; application filed March 18, 1876.

*To all whom it may concern:*

Be it known that I, RICHARD J. NUNN, of Savannah, in the county of Chatham and State of Georgia, have invented certain new and useful Improvements in Wood-Screws; and I do hereby declare that the following is a full, clear, and exact description of the same, reference being had to the accompanying drawings, making a portion of this specification, in which—

Figures 1 and 2 are plan views, showing modified forms of one feature of my invention. Fig. 3 is a longitudinal section, showing a modification of another feature. Fig. 4 is a detached view of a portion of the same. Fig. 5 is a partial longitudinal section, showing another feature of the invention. Fig. 6 is a detached view of a portion of the same. Figs. 7 and 8 are detached views of screw-drivers employed in driving and turning screws constructed according to my invention. Fig. 9 is a diametrical section through the screw.

Similar letters of reference indicate corresponding parts in all the figures.

This invention consists in the combination of nails or locking-brads with the screw as thus constructed, whereby the displacement of the screw, when in use, is effectually prevented.

The invention further consists in the combination of a supplemental head with the aforesaid locking-brads and screw, whereby the screws may be made to present a very ornamental and tasteful appearance.

The invention finally consists in a screw-head having notches or slots the sides of which are parallel to each other, and oblique to the longitudinal axis of the body of the screw, and converge, meeting at the top, as will be hereinafter described.

The body of the screw is shown at A, and *a* represents the head thereof. The said head, instead of being formed with a transverse groove in its upper side, as in the ordinary screw, is constructed with two slots or notches, *a'*, formed opposite each other in the edges thereof, as shown more clearly in Figs. 1 and 2, the said notches being formed with sloping ends. The sides of these notches or slots formed in the screw-head are parallel to each other, and oblique to the longitudinal axis of the body of the screw, converging and meeting at the top.

The screw-driver employed is shown in Fig. 7, and inasmuch as the downwardly-projecting spurs of the said drivers are so formed as to fit snugly in the slots or notches *a'* of the screw-heads, turning the screws, it follows that the screw may be turned around with much less liability of the driver slipping therefrom, or tearing or breaking the head thereof, than has been the case with the common wood-screw.

In order to prevent the screw from turning when the same has been forced into the wood, a nail or brad, *b*, the upper end *b'* of which may be so formed as to correspond in shape with the slots or notches *a'* of the screw, as shown in Fig. 4, is driven downwardly through each of the said notches, as represented in Figs. 3 and 5, and the said brads, being thus forced into the wood, one upon each side of the screw, effectually lock the same from turning around and becoming displaced.

Instead of being made separately or disconnected from each other, as shown in Figs. 3 and 4, it is preferred in many cases that the said locking-brads should be formed upon a supplemental head, *c*, as shown in Figs. 5 and 6, and which may be of any desired ornamental or other configuration, the said brads being driven through the notches *a'* of the screw-head *a*, in substantially the same manner as hereinbefore described, and serving not only to prevent the screw from turning, but also to securely attach or affix the ornamental head *c* upon or over the said screw-head, so as to give a tasty and decorative appearance to the top of the screw when used.

I prefer to form the grooves, slots, or notches in the heads of the screws, with inclined buttons *y y*, as above described, for the purpose of affording greater strength to the heads of the screws, and admitting of the use of a screw-driver having a V-shaped bit.

What I claim as new, and desire to secure by Letters Patent, is—

1. The nails or locking-brads *b*, in combination with the screw having its head constructed with nicks or notches $a'$, substantially as and for the purpose set forth.

2. The supplemental head $c$, in combination with the locking-brads $b$ and the notched head of the screw, substantially as and for the purpose set forth.

3. A screw the head of which is constructed with converging notches or slots, meeting at the top of the screw-head, the sides of which are parallel to each other, and oblique to the longitudinal axis of the body of the screw, substantially as described.

4. The combination, with a screw having its head provided with slots or notches the sides of which are parallel to each other, of a screw-driver having an angular bit to fit the slots or notches in the screw, substantially as described.

In testimony that I claim the above I have hereunto subscribed my name in the presence of two witnesses.

R. J. NUNN.

Attest:
WM. W. HOLLAND,
JAMES K. P. CARR.